United States Patent
Prasad et al.

(10) Patent No.: US 8,014,460 B2
(45) Date of Patent: Sep. 6, 2011

(54) METHOD FOR MULTIPLE-INPUT-MULTIPLE-OUTPUT SYSTEM DEMODULATION

(75) Inventors: Narayan Prasad, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 874 days.

(21) Appl. No.: 11/613,407

(22) Filed: Dec. 20, 2006

(65) Prior Publication Data

US 2008/0153449 A1    Jun. 26, 2008

(51) Int. Cl.
*H04B 7/02* (2006.01)
(52) U.S. Cl. .......................................... 375/267
(58) Field of Classification Search ............... 375/260, 375/261, 267, 316, 340, 346; 455/334
See application file for complete search history.

(56) References Cited

U.S. PATENT DOCUMENTS

| | | | |
|---|---|---|---|
| 2004/0111220 A1* | 6/2004 | Ochs et al. ............... | 702/19 |
| 2004/0165675 A1* | 8/2004 | Ito et al. .................. | 375/267 |
| 2004/0174939 A1* | 9/2004 | Wang ....................... | 375/316 |
| 2005/0157805 A1* | 7/2005 | Walton et al. ............. | 375/267 |
| 2006/0045062 A1* | 3/2006 | Gorokhov et al. ........ | 370/343 |
| 2006/0188044 A1* | 8/2006 | Wang et al. .............. | 375/347 |
| 2007/0011550 A1* | 1/2007 | Agrawal et al. .......... | 714/746 |
| 2007/0133722 A1* | 6/2007 | Agazzi et al. ............ | 375/346 |

OTHER PUBLICATIONS

Chen. R et al, Capacity-approaching LDPC Codes Based on Markov Chain Monte Carlo MIMO Detection, IEEE 6th Workshop on Signal Processing Advances in Wireless Communivations,Jun. 2005.*
Aggrawal P. et al., An Enhanced Deterministic Sequential Monte Carlo Method for Near-Optimal MIMO Demodulation With QAM Constellations, IEEE Transactions on Signal Processing, vol. 55, No. 6, Jun. 2007.*

* cited by examiner

*Primary Examiner* — Chieh M Fan
*Assistant Examiner* — Jaison Joseph
(74) *Attorney, Agent, or Firm* — Joseph Kolodka; Jeffery J. Brosemer

(57) ABSTRACT

A MMSE-based deterministic sequential Monte Carlo (SMC) method for MIMO demodulation exhibiting square root complexity in terms of constellation size. Further extensions to the method reduce the search space resulting in significant reduction in computational requirements while minimally impacting performance. As a hard decision algorithm, the methods achieve sphere decoder performance while imposing a much smaller computational load.

7 Claims, 11 Drawing Sheets

DETERMINISTIC SQUARE-ROOT SMC MIMO DETECTION

1: Perform MMSE-based pre-processing step to obtain Eqn(3);

2: Initialize the number of streams $n=1$, and the corresponding weight $w_{0,n}^{(j)}=1$;

3: for $k=n_t,\ldots,1$ do

4:     $n \leftarrow n \cdot \sqrt{M}$;

5:     Enumerate all $n$ candidates corresponding to the real component of the symbol;

6:     Compute the importance weight $w_k^{(j)}$ according to Eqn(11), $j=1,\ldots,n$;

7:     if $n \leq m$ then

8:        Append the real component $x_k^{(j)}$ to $S_k^{(j)}$ to obtain $(x_k^{(j)}, S_k^{(j)}), j=1,\ldots,n$;

9:     else if $n > m$ then

10:       Sort the $n$ streams according to their importance weights $w_k^{(j)}$ 11:       Select $m$ streams with highest importance weights; Set $n=m$;

12:     end if

13:     $n \leftarrow n \cdot \sqrt{M}$;

*FIG. 10(A)*

DETERMINISTIC SQUARE-ROOT SMC MIMO DETECTION(Cont.)

14: Enumerate all $n$ candidates for the imaginary
    component of the symbol;

15: Compute the importance weight $w_k^{(j)}$ according to
    Eqn(12), $j=1,...,n$;

16: if $n \leq m$ then

17:     Append the imaginary component $s_{k,i}^{(j)}$ to $\left(S_{k,R}^{(j)}, S_{k,i}^{(j)}\right)$ to
        obtain $S_k^{(j)}, j=1,...,n$;

18: else if $n > m$ then

19:     if $k > 1$ then

20:         Sort the $n$ streams according to their
            weights $w_k^{(j)}$;

21:         Select $m$ streams with highest importance
            weights; Set $n=m$;

22:     end if

23: end if

24: end for

25: Compute $p(s_{k,i} = \alpha_i | y)$ using Eqn(13), Eqn(15) and
    $p(s_{k,R} = \alpha_i | y)$ using Eqn(14) $k=1,...,n_T, \alpha_i \in A$

FIG. 10(B)

METHOD FOR MULTIPLE-INPUT-MULTIPLE-OUTPUT SYSTEM DEMODULATION

FIELD OF THE INVENTION

This invention relates generally to the field of mobile wireless communications and in particular it relates to an improved sequential Monte Carlo (SMC) method for demodulating Multiple-Input-Multiple-Output (MIMO) systems.

BACKGROUND OF THE INVENTION

Mobile wireless communications systems employing multiple transmit and receive antennas have received much attention lately. This is due—in part—to the fact that the capacity of such systems increases linearly with the minimum of the number of transmit and receive antennas without requiring any additional power or bandwidth. (See for example, G. J. Foschini, "Layered Space-Time Architecture For Wireless Communication in a Fading Environment When Using Multi-Element Antennas", Bell Labs Tech. J., 1(2):41-59, 1996).

Of the known signal detection schemes employed in contemporary MIMO systems, a maximum-likelihood (ML) scheme is one of the most attractive. Unfortunately however, ML schemes exhibit a computational complexity that is $O(M^{n_T})$, where M is the constellation size and $n_T$ is the number transmit antennas. This exponential complexity makes its implementation infeasible or impractical for large systems.

Sphere decoder schemes exhibit performance identical to that of ML detection schemes—oftentimes at a lower average computational complexity. For a system of representative Signal-to-Noise Ratio (SNR) and constellation size however, its computational complexity has also been shown to be exponential in the number of transmit antennas. In addition when one considers that the computational complexity of a sphere decoder scheme is channel dependent and that it typically produces hard decisions only—the attractiveness of a sphere decoder scheme is lessened substantially.

Several suboptimal interference cancellation (IC) based detection schemes have been developed and in particular zero-forcing (ZF) nulling and IC with ordering, and MMSE nulling and IC with ordering are among the best known. (See, for example G. D. Golden, et. al, "Detection Algorithm and Initial Laboratory Results Using V-BLAST Space-Time Communication Architecture", Elect. Let., 35:14-16, January 1999; and P. W. Wolniansky, et. al., "V-BLAST: An Architecture For Realizing Very High Data Rates Over the Rich-Scattering Wireless Channel", Proc. 1998 Intl. Symp. Sig. Sys. Elect. (ISSSE'98), pp. 295-300, Pisa, Italy, September 1998) And while these schemes generally exhibit a low complexity, their performance leaves much to be desired as they are generally much inferior to the ML detector schemes.

Recently however, a new class of detection schemes based on sequential Monte Carlo techniques has been proposed which approach the performance of ML schemes while exhibiting a computational complexity that is linear in M and $n_T$. In addition, these SMC-based schemes are both "soft-input" and "soft-output", and are particularly well suited for turbo processing in coded MIMO systems. As the constellation size or the number of transmit antennas increase however, the complexity of existing SMC MIMO detectors—while considerably lower than ML detectors—becomes unacceptably high.

SUMMARY OF THE INVENTION

An advance is made in the art in accordance with the principles of the present invention directed to a near-optimal, low-complexity MMSE-based sequential Monte Carlo scheme for demodulation in MIMO systems. Advantageously, the scheme exploits the rectangular structure of a signal constellation by separating the real and imaginary parts of the signal constellation thereby reducing the complexity associated with listing and weight update steps in SMC procedures.

According to an aspect of the invention, a received signal is processed by a MMSE-based preprocessing step which also determines an optimal channel-dependent detection order. Monte Carlo samples are then drawn in a deterministic manner, and survivor paths are selected based on their importance weights.

According to yet another aspect of the invention, separating the real and imaginary components of a received signal results in a complexity which varies as $O(\sqrt{M})$ complexity in terms of constellation size which is in sharp contrast to prior-art SMC-based methods which exhibit O(M) complexity for an M-QAM constellation. As a result, the methods that employ the present invention produce performance levels equivalent to that of a sphere decoder for V-BLAST systems while only imposing modest computational requirements. Consequently, such methods are particularly well-suited for use in a variety of MIMO systems—including those having large constellations or those having a large number of receive and transmit antennas.

Lastly, and according to yet another aspect of the present invention, the deterministic SMC methods of the present invention are both soft-input and soft-output in nature and can serve as the first stage demodulator in a turbo receiver in a coded MIMO system.

DESCRIPTION OF THE DRAWING

Further features and aspects of the present invention may be understood with reference to the accompanying drawing in which:

FIGS. 10(A) and 10(B) are pseudo-code listings for Prior Art deterministic square-root SMC detection as employed according to the present invention.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Figure 1:
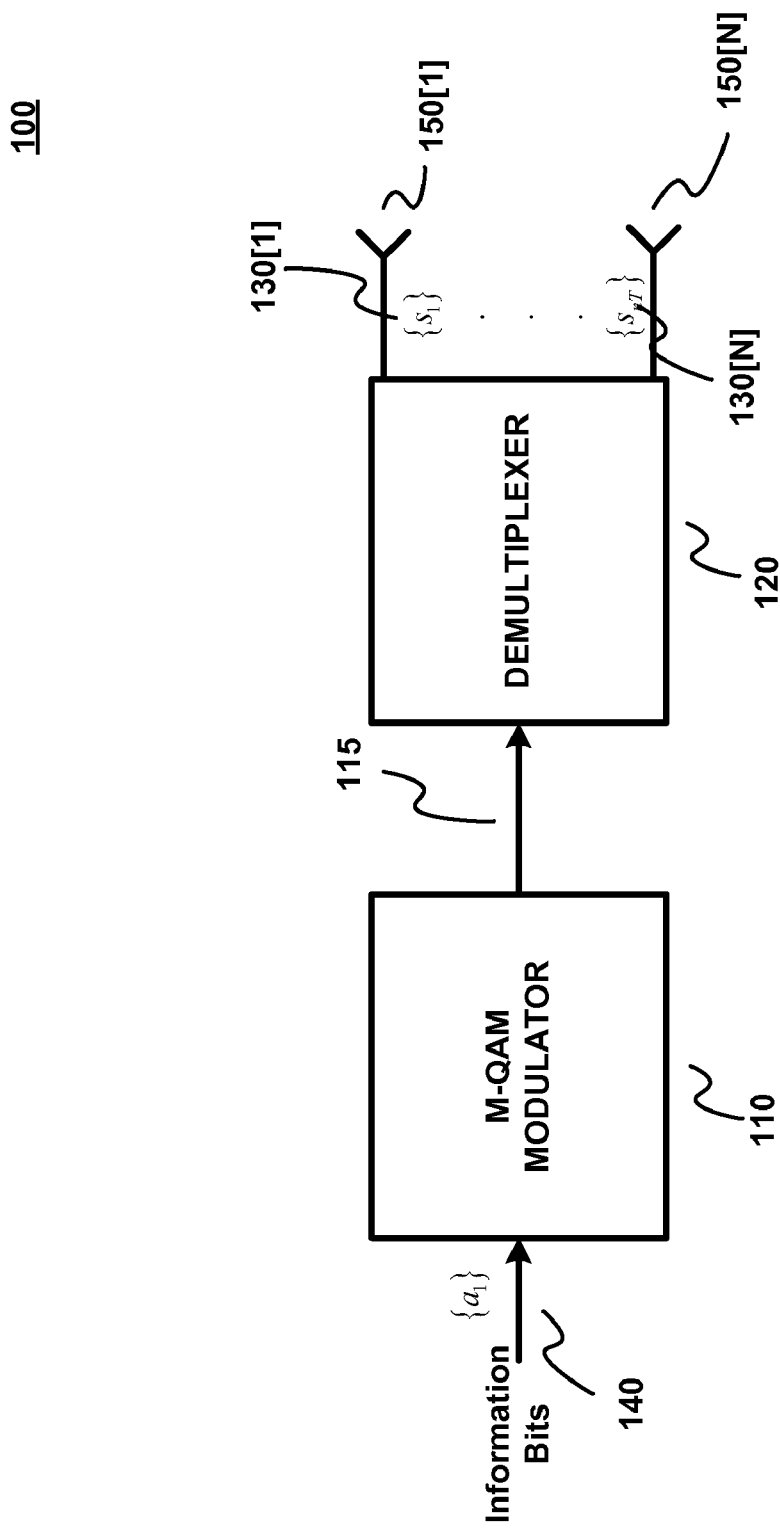
FIG. 1 is a schematic block diagram of a representative MIMO system.

Before discussing the theoretical underpinnings of the present invention it is useful to first consider an uncoded MIMO system such as that shown schematically in FIG. 1. As can be observed from that FIG. 1, such systems include several components at a transmitter side including an M-QAM Modulator 110, a Demultiplexer 120, an input bit sequence 140, and a number of output substreams 130.

Operationally—at the transmitter—a binary information bit sequence $\{a_i\}$ 140 is mapped to complex data symbols that take values from an M-QAM alphabet set $A=\{a_1, a_2, \ldots, a_M\}$ through the effect of the M-QAM modulator 110. An output symbol stream 115 is subsequently demultiplexed through the effect of the demultiplexer 120 into $n_T$ parallel substreams 130 of equal rate, $\{s_k\}$, k=1,2, ..., $n_T$, where substream $\{s_k\}$ is associated with the k-th transmit antenna. During each symbol interval, $n_T$ symbols are transmitted simultaneously, one from each of the transmit antennas 150(1) ... 150($n_T$).

Figure 2:
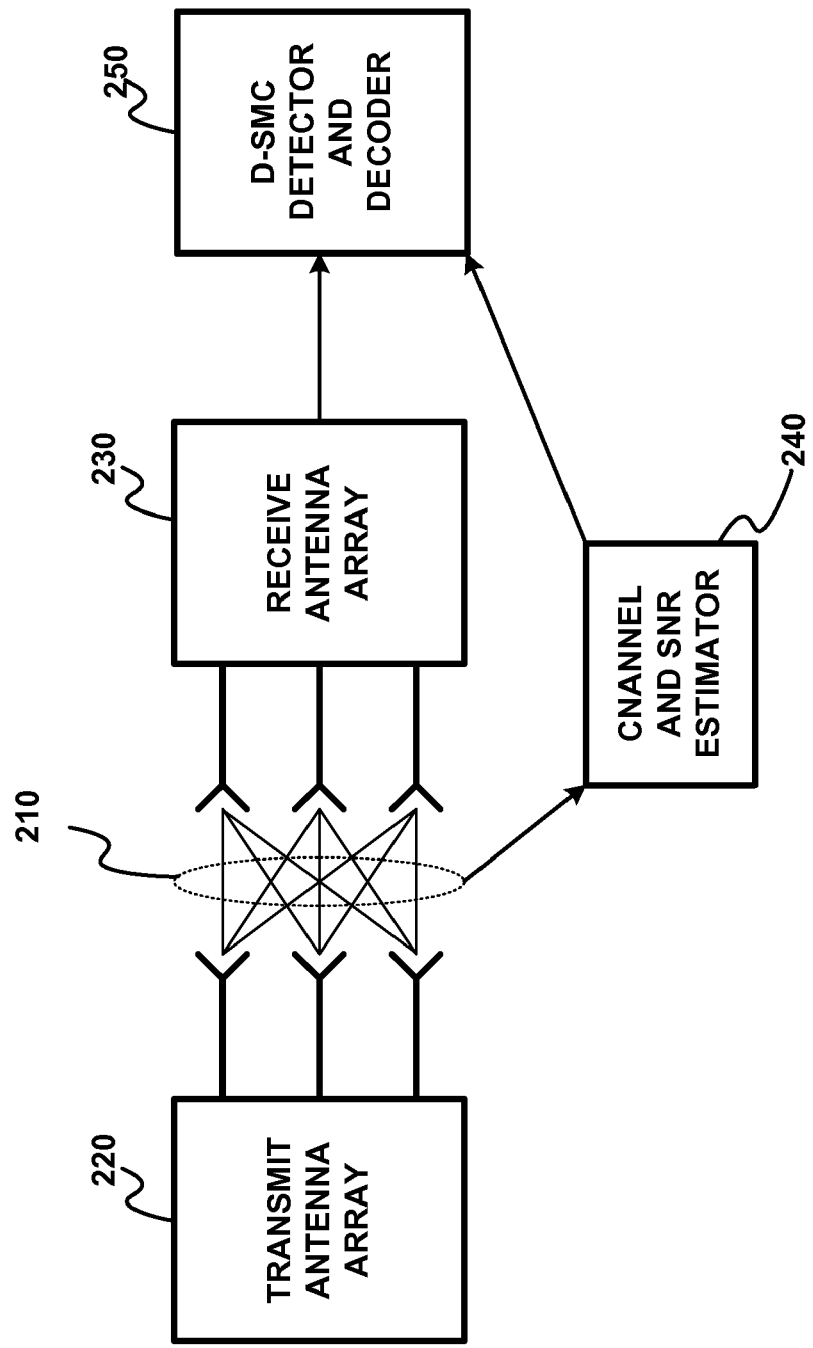
FIG. 2 is a schematic block diagram of a representative MIMO system wherein the receiver employs only a prior-art D-SMC algorithm.

FIG. 2 is a schematic block diagram of a MIMO system 200 which comprises transmit antenna array(s) 220, receive antenna array(s) 230 in communication via wireless network 210. As is known by those skilled in the art, existing receivers 250 such as that shown, typically comprise a Deterministic Sequential Monte Carlo Detector and Decoder employing channel and Signal-to-Noise ratio estimates 240 for detection.

Figure 3:
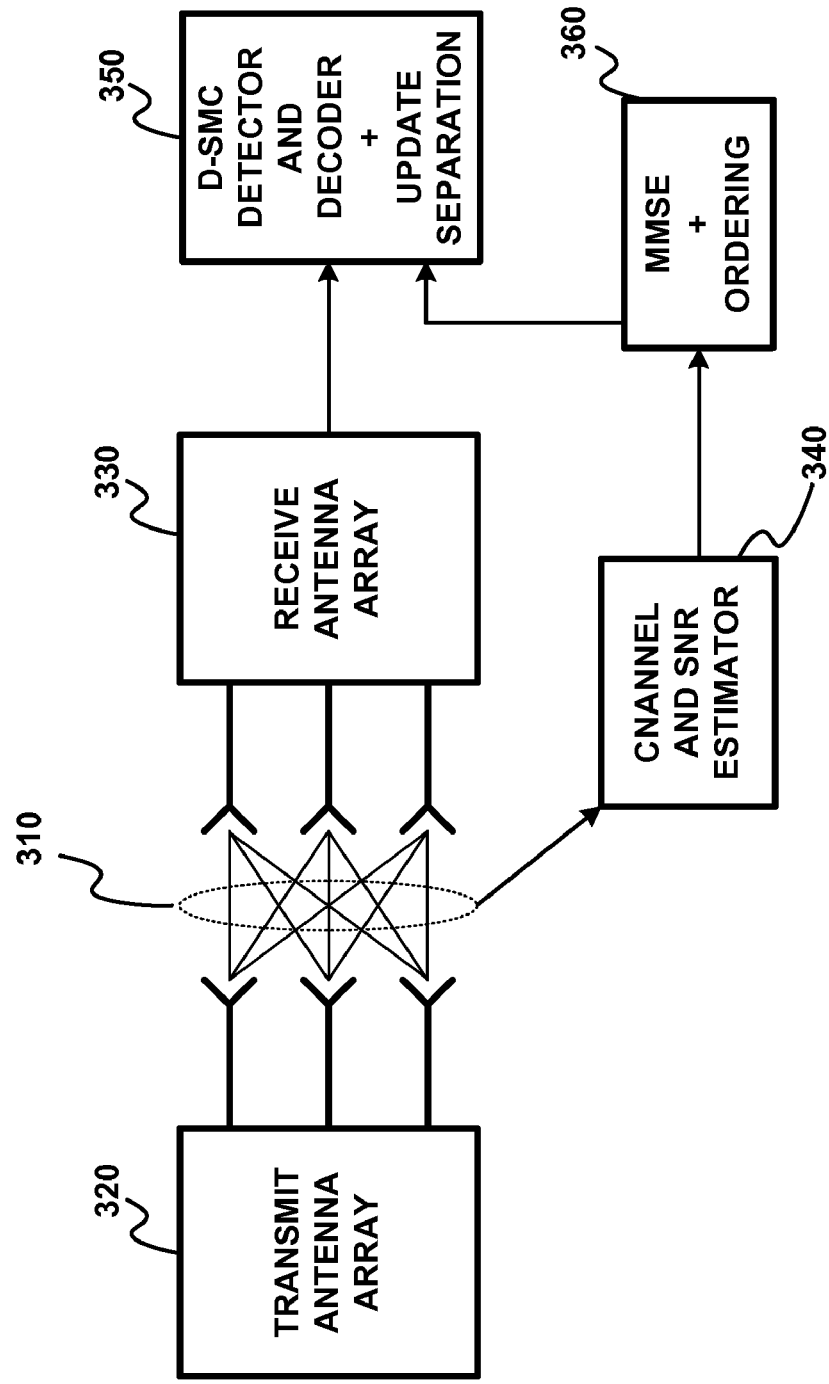
FIG. 3 is a schematic block diagram of a representative MIMO system according to the present invention.
Figure 4:
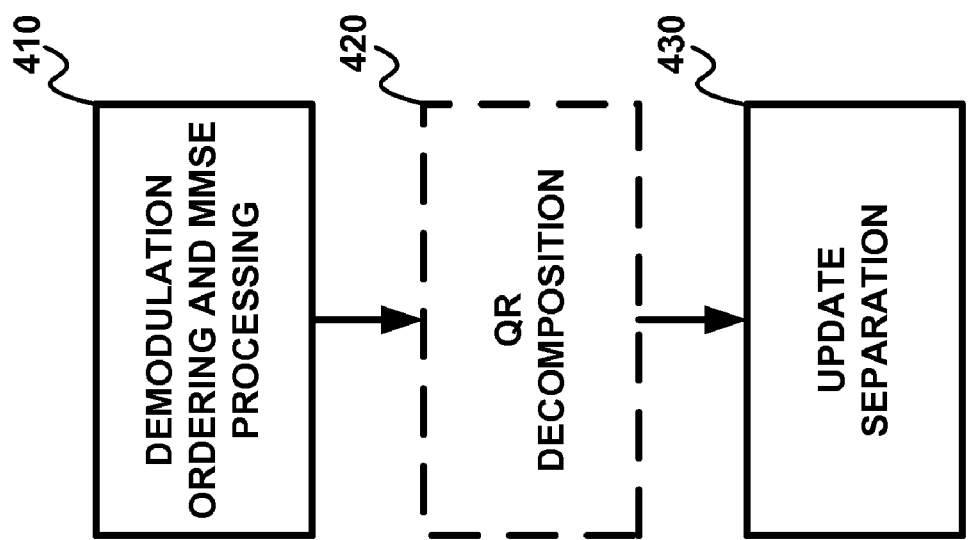
FIG. 4 is a generalized flow diagram depicting the steps of a method according to the present invention.

In contrast, and according to the principles of the present invention, a MIMO system 300 such as that shown in FIG. 3 significantly supplements the prior art system by performing MMSE processing and Ordering 360 and update separation 350 which both improves the result(s) and reduces complexity, respectively.

Importantly, and as can be appreciated by observing FIG. 3, the SMC detector is supplemented with an update separation mechanism. This detector 350 is preceded by the MMSE processing and ordering 360 which is advantageously modular and "front-ends" existing or low-complexity decoders which are the subject of the present invention. As will be shown, the MMSE processing 360 provides a well-conditioned channel matrix to the SMC detector 350 whereas channel dependent ordering 360 gives an appropriate (well tailored) detection order to the detector 350 thereby improving the result(s).

As can be appreciated by those skilled in the art, existing SMC detectors such as that shown in FIG. 2 oftentimes make detection errors since they are unable to determine correct symbol vector(s) under imposed complexity constraints—which may be specified in terms of the number of streams operated upon. Stated alternatively, to reduce the probability of detection error one must increase the number of streams thereby increasing decoder complexity.

Advantageously, and according to the principles of the present invention, this increase in complexity is avoided by providing that a much higher proportion of well-conditioned, processed channel matrices and associated detection orders to the SMC detector. Of further advantage, the processing need be done only once every channel realization so that its computational "cost" is negligible for practical channels with moderate-to-large coherence times.

Of particular significance, the update separation for the SMC detector may be used with or without the MMSE based front end. As will become clear, this update separation "splits" each transmit antenna into two virtual antennas with one transmitting the real part and the other transmitting the imaginary part of the original complex-valued QAM symbol. The SMC procedure is then applied to the resulting system having twice the number of antennas but where each antenna now transmits a PAM symbol. As a result—for a system where each transmit antenna employs M-QAM constellation, the number of additions per stream is reduced by a factor of $\sqrt{M}$ compared to the improved or prior art SMC detector. The sorting complexity is also significantly reduced with only a negligible loss in performance.

When employed according to the present invention, demodulation ordering and MMSE processing are first performed 410 which makes the channel matrix more stable and provides a good demodulation order. The resulting matrix may then subjected to QR decomposition 420. Update separation 430 exploits particular characteristics of the result, thereby significantly reducing the computational complexity.

A transmitter such as that shown in FIG. 1 is assumed to have no channel state information—therefore all transmitted symbols are assigned equal power $\rho/n_T$, where $\rho$ is the total power available at the transmitter. Furthermore, such a system is assumed to be signaling in a flat fading channel in the presence of white Gaussian noise. Finally, it is assumed that the channel is quasi-static, for example, the channel remains static during a data-burst, but changes randomly from burst to burst.

We may denote the transmitted signal vector at the i-th time instant as $s(i)=[s_1(i), \ldots, s_{n_T}(i)]^T$. At a receiver end, after symbol-rate sampling of a received signal, the received signal $y(i)=[y_1(i), \ldots, y_{n_R}(i)]^T$ at the i-th time instant is given by:

$$y(i) = \sqrt{\frac{\rho}{n_T}} Hs(i) + v(i) \quad i = 1, \ldots N, \tag{1}$$

where $H \in C^{n_R \times n_T}$ is the complex fading channel matrix assumed to be known at the receiver, $v(i) \sim N_c(0, I_{n_R})$ is the spatially and temporally white Gaussian noise, and N is the data burst length. With these principles in place, we may now derive a SMC MIMO detection method within a deterministic framework whose complexity—according to the present invention—is $O(\sqrt{M})$ for M-QAM constellations.

Ordering Based Upon MMSE Criterion

According to the present invention, the motivation for ordering in the nulling and cancellation algorithm is to perform the detection from the "strongest" signal(s) to the weakest signal(s) so that any error-propagation effect(s) due to a wrongly-detected symbol(s) is minimized. For the purposes of this discussion and the present invention, the terms "strong" and "weak" are a measure of the post-detection SNR based on either ZF or MMSE criterion. Since MMSE detection is generally known to have better performance than ZF detection, it is the method of choice for the present invention and our discussion herein is so focused. And while MMSE is preferred, it is nevertheless understood by those skilled in the art that ZF detection may be used with the present invention.

Consider the augmented channel matrix $$[I\sqrt{\eta}\ H^T]^T, \text{ where } \eta = \frac{\rho}{n_T}.$$

We denote $P=(I+\eta H^H H)^{-1}$. The method proceeds with finding the minimum diagonal entry of P and reordering the channel matrix followed by deflating the channel matrix which includes deleting the corresponding column. The new P is computed with the deflated channel matrix and the process is repeated to find the next symbol to be detected. As a side-product of the ordering method, we obtain the nulling matrix W, which is formed by appending the corresponding row of $PH^H$ to W at each step.

Advantageously—and according to the present invention—the complexity of the above (optimal) ordering method is $O(n_T^4)$, and the repeated calculation of the pseudo-inverse of the augmented channel matrix accounts for most of the computational load. Fortunately however, the repeated computation of the pseudo-inverse can be avoided by using known square-root algorithm described in an article entitled "An Efficient Square-Root Algorithm for BLAST", authored by B. Hassibi and which appeared in *Proc. 2000 IEEE Int. Conf. Acoustics, Speech, and Sig. Proc (ICASSP '00)* volume 2, pp. 737-740, June 2000, which carries out these calculations with a complexity of only $O(n_T^3)$. Further reduction in complexity is possible—according to the present invention—using the steps outlined in a publication by D. W. Waters and J. R. Barry, entitled "Noise-Predictive Decision-Feedback Detection for Multiple-Input Multiple-Output Channels," which appeared in *IEEE Transactions on Signal Processing*, vol. 53, No. 5, pp. 1852-1859, May 2005

Highlighting the flexibility of the present invention, yet another approach of ordering employs the $O(n_T^2)$, column-norm based ordering which permutes the columns of the given channel matrix $H=[h_1, \ldots, h_{n_T}]$ to obtain $\tilde{H}=[\tilde{h}_1, \ldots, \tilde{h}_{n_T}]$ such that $\|\tilde{h}_1\| \leq \ldots \leq \|\tilde{h}_{n_T}\|$. Note that in slowly varying channels, these computations are advantageously only performed once at the beginning of each block, and therefore comprise only a small fraction of the overall computations—which are predominantly composed of the demodulation procedure. Of further advantage—and according to the principles of the present invention—the computational complexity of this demodulation may be further reduced as well.

Deterministic SMC MIMO Detector

We begin by letting $\tilde{H}=HP$ be the channel matrix obtained after ordering as described above, with P being the corresponding permutation matrix. Further, we let QR—the augmented channel matrix—be $[I\sqrt{\eta}\tilde{H}^T]^T=QR$, where Q is a $(n_T+n_R) \times n_T$ matrix having orthogonal columns and R is a $n_T \times n_T$ upper triangular matrix with positive diagonal elements and $R^H R = I+\eta \tilde{H}^H \tilde{H}$. If we parse Q as $Q=[Q_1^T, Q_2^T]^T$ where $Q_2$ denotes the matrix formed by the last $n_R$ rows of Q then the MMSE-preprocessing filter F that we use is given by $F=\sqrt{\eta}R^{-H}\tilde{H}^H=Q_2^H$.

We note that no matrix inversion is necessary to determine the MMSE filter. Filtering the received signal y, we obtain:

$$z=Fy=RP^{-1}s+w \quad (2)$$

where the time index i is dropped for simplicity. At this point we note that the noise $w=(\sqrt{\eta}Q_2^H \tilde{H}-R)P^{-1}s+Q_2^H v$ is not strictly Gaussian as it contains a signal dependent non-Gaussian term as well. The Gaussian assumption on w however, works well in practice and in the discussion that follows we assume w to be Gaussian. Also, under the assumptions that v and s are uncorrelated with zero mean and covariance I, it can be shown that $E[w\ w^H]=I$. Also, note that R is an upper triangular matrix. In the following—taking some liberties with the notational correctness—we let s denote $P^{-1}s$. Then writing equation (2) explicitly, we obtain:

$$\underbrace{\begin{bmatrix} z_1 \\ z_2 \\ \vdots \\ z_{n_T} \end{bmatrix}}_{z} = \underbrace{\begin{bmatrix} r_{1,1} & r_{1,2} & \cdots & r_{1,n_T} \\ & r_{2,2} & \cdots & r_{2,n_T} \\ & & \ddots & \cdots \\ & & & r_{n_T,n_T} \end{bmatrix}}_{R} \underbrace{\begin{bmatrix} s_1 \\ s_2 \\ \vdots \\ s_{n_T} \end{bmatrix}}_{s} + \underbrace{\begin{bmatrix} w_1 \\ w_2 \\ \vdots \\ w_{n_T} \end{bmatrix}}_{w} \quad (3)$$

The artificial sequential structure of equation (3) is evident and is well suited for application to SMC. As can now be appreciated by those skilled in the art, from the above representation the target probability density for the samples of the MIMO symbols can be equivalently represented as $p(s|y)=p(s|z)$. Additionally, we denote $\tilde{Z}_k=(z_k, \ldots, z_{n_T})$ and $\tilde{S}_k=(s_k, \ldots, s_{n_T})$.

A deterministic approach within the SMC framework is to list the symbols $s_k$, $k=n_T, \ldots, 1$ at each antenna, starting from the $n_T$-th antenna down to the 1-st antenna, and select the survivors according to the greatest weights—where the weights are calculated using the sequence of aposteriori distributions namely:

$$p(s_k|\tilde{S}_{k+1}^{(j)}, \tilde{Z}_k) \propto p(z_k|s_k, \tilde{S}_{k+1}^{(j)}, \tilde{Z}_{k+1}) p(s_k) \quad (4)$$

Note that the first term in the product in equation (4) is Gaussian, i.e., $p(z_k|s_k=a_l, \tilde{S}_{k+1}^{(j)}, \tilde{Z}_{k-1}) \sim \phi(\mu_{k,l}^{(j)}, 1)$ where the mean $\mu_{k,l}^{(j)}$ is given by:

$$\mu_{k,l}^{(j)} = \sum_{i=k+1}^{n_T} r_{k,i} s_i^{(j)} + r_{k,k} a_l, \ a_l \in A \quad (5)$$

The importance weight for the j-th stream can be updated recursively according to the following:

$$w_k^{(j)} \propto w_{k+1}^{(j)} \cdot p(z_k|s_k=a_l, \tilde{S}_{k+1}^{(j)}, \tilde{Z}_{k+1}) p(s_k=a_l) \quad (6)$$

It should be noted that one drawback of the above approach is that for each Monte Carlo stream, we need to compute $\mu_{k,l}^{(j)}$ and $p(s_k=a_l|\tilde{S}_{k+1}^{(j)}, \tilde{Z}_k)$ in Equations (5) and (4) respectively, corresponding to each element $a_l \in A$ and then sort $m \cdot |A|$ streams to find surviving paths, where m is the number of Monte Carlo streams.

Such a strategy has a computational complexity O(M) per stream, and even for a moderate value of m and M, such a complexity becomes high. However, QAM constellations—which are commonly used in MIMO systems—have rectangular structure which can be exploited to decouple the real and imaginary signal components and hence reduce the computational complexity associated with the weight update and selection steps without attendant compromise in performance.

At this point, and according to the present invention, we may now describe a square-root SMC MIMO detection method which—by separating real and imaginary components of the signal—not only achieves a superior computational complexity of $O(\sqrt{M})$ per stream but also reduces the task of sorting m·M streams per antenna to sorting m·$\sqrt{M}$ streams twice at each antenna—once each for the real and imaginary component respectively.

Exploiting the Rectangular Constellation Structure

Now, consider a square M-QAM constellation with real and imaginary components of the signal $$s_r, s_i \in \Omega = \frac{1}{E_s}(-\sqrt{M}+1, -\sqrt{M}+3, \ldots, \sqrt{M}-3, \sqrt{M}-1) = (\omega_1, \ldots \omega_{\sqrt{M}})$$

Where $s_r + 1s_i = s \in A$, $E_s$ is the normalizing factor, and $|\Omega|=\sqrt{M}$. With such a scheme, $B=\log_2 M$ bits are gray-mapped to a QAM symbol. Let the first $$\frac{B}{2}$$

bits represent its real component and the latter $$\frac{B}{2}$$

bits correspond to the imaginary component.

At this point a key observation is worth noting namely that when such a rectangular constellation is used, the observation at a particular antenna in Equation (3)—after canceling the interference from already sampled symbols—can be separated into real and imaginary components which are dependent only on the respective real and imaginary components of the symbol at the same antenna. This occurs because the diagonal elements of the R matrix are positive real, and hence allow us to separate the two components. A direct consequence of this is that we can draw samples of the real and imaginary components of the symbol at an antenna independently, thereby reducing the number of possible candidates from M to $\sqrt{M}$ Continuing, we let $a_j = \omega_{l_1} + 1\omega_{l_2}$. Then, the probability distribution in Equation (4) may be factored as $$p(s_k | \tilde{S}_{k+1}^{(j)}, \tilde{Z}_k) \propto \frac{p(z_{k,r} | s_{k,r}, \tilde{S}_{k+1}^{(j)}, \tilde{Z}_{k+1}) p(s_{k,r})}{\alpha_{k,r}^{(j)}} \times \frac{p(z_{k,i} | s_{k,i}, \tilde{S}_{k+1}^{(j)}, \tilde{Z}_{k+1}) p(s_{k,i})}{\alpha_{k,i}^{(j)}} \quad (7)$$

where $$p(z_{k,r} | s_{k,r} = \omega_{l_1}, \tilde{S}_{k+1}^{(j)}, \tilde{Z}_{k+1}) \sim \phi\left(\mu_{k,r}^{(l_1,j)}, \frac{1}{2}\right)$$

and $$p(z_{k,i} | s_{k,i} = \omega_{l_2}, \tilde{S}_{k+1}^{(j)}, \tilde{Z}_{k+1}) \sim \phi\left(\mu_{k,i}^{(l_2,j)}, \frac{1}{2}\right)$$

wherein the means $\mu_{k,r}^{(l_1,j)}$ and $\mu_{k,i}^{(l_2,j)}$ are given by $$\mu_{k,r}^{(l_1,j)} = \text{Re}\left(\sum_{n=k+1}^{n_T} r_{k,n} s_n^{(j)}\right) + r_{k,k} \omega_{l_1} \quad (8)$$

and $$\mu_{k,i}^{(l_2,j)} = \text{Im}\left(\sum_{n=k+1}^{n_T} r_{k,n} s_n^{(j)}\right) + r_{k,k} \omega_{l_2} \quad (9)$$

respectively. Here the subscripts r and i denote the real and imaginary components respectively.

Also note that the first term in the RHS of (8) (as well as (9)) is independent of the real (imaginary) candidate and hence needs to be computed only once. Moreover since the second terms in the RHS of (8) and (9) belong to a common set $r_{kk}\Omega$, we need to determine the elements of this set only once. Further soft inputs in the form of a-priori probabilities $\{p(s_{k,r}), p(s_{k,i})\}$ are naturally accommodated in $\alpha_{k,r}^{(j)}$, $\alpha_{k,i}^{(j)}$ given by Equation (7).

Advantageously—according to an aspect of the invention and as can be readily appreciated by those skilled in the art—this approach has a two-fold beneficial effect in the sense that at each antenna, instead of computing M weight updates for each stream, there are only $2 \cdot \sqrt{M}$ weight updates. In addition, the number of streams that need to be sorted in the selection step decreases by a factor of $\sqrt{M}$.

Further indication of the flexibility of the present invention, we note that by separating the listing of real and imaginary components, a small amount of "sub-optimality" is introduced since not all of the possible M symbols are listed for each Monte Carlo stream this way. However—as we will discuss later—experimental results show that any loss in BER performance is quite small. Those skilled in the art will readily appreciate that this loss is far offset by the tremendous reduction in computational load.

The deterministic SMC method may now be explained. In summary, it comprises two phases—a "growth" phase and a "search and select" phase. During the growth phase, as long as the number of nodes produced is less than a pre-determined number m, the Monte Carlo streams grow in a $\sqrt{M}$-ary tree-like manner. At each antenna, the real components are listed followed by the imaginary components of the signal resulting in each node contributing $\sqrt{M}$ candidates. Let the growth phase continue until the k-th antenna. Finally, the importance weight of the j-th stream in this phase is given by it's a posteriori density as:

$$w_k^{(j)} \propto p(\tilde{S}_k^{(j)} | \tilde{Z}_k) \propto \prod_{n=\kappa}^{n_T} \alpha_{n,r}^{(l_1,j)} \cdot \alpha_{n,i}^{(l_2,j)} \quad (10)$$

where $\alpha_{n,r}^{(l_1,j)}$ and $\alpha_{n,i}^{(l_2,j)}$ are given by Equation (7).

As noted before, the second phase of the method is the search and select phase. At each of the subsequent antennas, each stream produces $\sqrt{M}$ candidates for the real part of the symbol thereby producing a total of m·$\sqrt{M}$ candidates. Their weights are updated according to:

$$w_{k,r}^{(j)} \propto w_{k+1}^{(j)} \cdot \alpha_{k,r}^{(l_1,j)} \quad (11)$$

and select m streams with the highest weights. Next, for these m streams, the imaginary components are searched, again producing $m\cdot\sqrt{M}$ candidate paths. The weights are then updated as:

$$w_k^{(j)} \propto w_{k,r}^{(j)} \cdot \alpha_{k,i}^{(l2,j)} \quad (12)$$

and the m streams with highest weights are selected to proceed to the next antenna. Note that we need to extract only the m streams of highest weights from a list of $m\cdot\sqrt{M}$ candidates. Moreover we do not require the extracted m streams to be sorted. Consequently we can use classical algorithms in computer science developed precisely for such problems—see for instance "The art of computer programming—sorting and searching" by Donald Knuth, Addison Wesley 1973—which for our case will require an expected time of $O(m\cdot\sqrt{M})$ At this point we note that the sorting procedure can change the path labeling. To simplify the notation used, we do not explicitly show this change. Returning to our discussion, we note that at the end of the SMC procedure, when the detector reaches the $1^{st}$ antenna, we retain all of the $m\cdot\sqrt{M}$ Monte Carlo samples and do not sort and discard any imaginary components.

Advantageously, the importance weights are used to obtain a better estimate of the transmitted signal. Fortunately, it has been shown (See, e.g., R. Chen, et. al, "Adaptive Joint Detection and Decoding In Flat-Fading Channels VIA Mixture Kalman Filtering", *IEEE Trans. Inform. Theory*, 46(6):2079-2094, September 2000) that the use of delayed weight estimation technique yields more accurate estimates. Therefore, for each of the symbols $s_{k,r}$ and $s_{k,i}$, $k=1, 2, \ldots, n_T$ we use the importance weights obtained at the last SMC recursion, i.e., corresponding to k=1 for computing the a posteriori symbol probabilities given by:

$$p(s_{k,r} = \omega_l | y) \cong \frac{1}{W_1} \sum_{j=1}^{m\cdot\sqrt{|A|}} \mathbb{I}[(s_{k,r}^{(j)} = \omega_l) w_1^{(j)}], \quad (12)$$

and $$p(s_{k,i} = \omega_l | y) \cong \frac{1}{W_1} \sum_{j=1}^{m\cdot\sqrt{|A|}} \mathbb{I}[(s_{k,i}^{(j)} = \omega_l) w_1^{(j)}], \quad (13)$$

where $$W_1 \triangleq \sum_{j=1}^{m\cdot\sqrt{|A|}} w_1^{(j)},$$

$k=1,2,\ldots n_T$, $\omega_l \in \Omega$ and m is the number of Monte Carlo streams fixed at the beginning of the procedure.

We now note that the dominant computations in the SMC procedure occur in the weight update steps represented by Equations (11) and (12), and the sorting step to select the survivor paths. For example, consider a constellation with size M. The number of weight-updates required for each stream with the square root strategy according to the principles of the present invention is $2\cdot\sqrt{M}$ whereas the prior art SMC based direct approach described earlier requires M such computation. In addition, at each antenna, the method according to the present invention sorts $m\cdot\sqrt{M}$ twice, as compared to sorting $m\cdot M$ streams required by the prior art SMC. The reduction in these computations becomes more pronounced as the problem size increases, i.e., in systems with larger constellations or a large number of antennas. The deterministic MMSE-based square-root SMC algorithm is summarized in Listing 1 shown in FIG. 10(A) and FIG. 10(B).

We also note that one particularly interesting feature of the method of the present invention is that it can be easily extended to narrow-band multi-user systems having different data rates for different users as long as they are symbol synchronous. In other words—in such a system—different users (antennas) transmit symbols belonging to different symbol constellations to satisfy their respective data rates. The receiver for this system, during the listing stage, utilizes the knowledge of the rate allocation to choose the candidates from appropriate constellation(s). As we shall now show, we have developed a superior ordering for this multi-rate system.

Let $[R_1, \ldots, R_{n_T}]$ be the vector representing the rate allocation for the different transmit antennas. The corresponding constellation sets can then be denoted as $[A_1, \ldots, A_{n_T}]$ and let the power allocation vector be $[p_1, \ldots, p_{n_T}]$ such that $p_i$ denotes the fraction of the total transmit power allocated to the $i^{th}$ transmit antenna. The ordering rule is simply to detect first, the symbol corresponding to the antenna with the minimum probability of error $$P(e_k) = 2\left(1 - \frac{1}{\sqrt{A_k}}\right) Q\left(\sqrt{\frac{2p_k \rho}{\|b_k\|^2 E_k}}\right)$$

where $\|b_k\|$ is the norm of the $k^{th}$ row of the LMMSE-nulling matrix B, which is obtained as the first $n_T$ columns of the pseudo-inverse of the augmented channel matrix $[\sqrt{\eta}H^T]^T$ and $E_k$ is the normalization constant for the corresponding QAM constellation After this, we remove the column corresponding to the chosen antenna from the matrix H, and repeat the process for the remaining antennas. Also, we can extend the column norm ordering here, by replacing $\|b_k\|$ by the corresponding column norm from H and then determining the order by finding the error probability.

Reduced Search

According to the principles of the present invention—only a few of the $\sqrt{M}$ candidates emerging from a stream carry any significant weight. More specifically, the remaining ones are too far away from a received signal and are therefore unlikely to have much significance. Accordingly, the present invention includes as an aspect a reduced search technique.

Recall that $z_{k,r}$ and $z_{k,i}$ may be written as:

$$z_{k,r} = r_{k,k} s_{k,r} + \mathrm{Re}\left(\sum_{n=k+1}^{n_T} r_{k,n} s_n\right) + w_{k,r} \quad (14)$$

$$z_{k,i} = r_{k,k} s_{k,i} + \mathrm{IM}\left(\sum_{n=k+1}^{n_T} r_{k,n} s_n\right) + w_{k,i} \quad (15)$$

Using this fact, instead of listing all $\sqrt{M}$ candidates for each stream, we list only $$\frac{\sqrt{M}}{c}$$

of the elements closest to $$\frac{z_{k,r} - \mathrm{Re}\left(\sum_{n=k+1}^{n_T} r_{k,n} s_n^{(j)}\right)}{r_{k,k}}$$

and $$\frac{z_{k,i} - \mathrm{Im}\left(\sum_{n=k+1}^{n_T} r_{k,n} s_n^{(j)}\right)}{r_{k,k}}$$

respectively, where c is a factor greater than or equal to one and is specified beforehand. Advantageously, this step helps in reducing the weight updates and sorting requirements further, with very small to moderate loss in BER performance depending upon the factor c.

Lattice Decoding

As is known by those skilled in the art, lattice codes are widely used in digital communications systems as high-rate signal constellations. For our purposes herein, we consider the transmission of Lattice Space-Time (LAST) codes and further assume that $n_T=n_R$. Then an N-dimensional; lattice $\Lambda \subset R^N$ is defined as $\Lambda=\{Gx:x \in Z^N\}$ where Z is the set of all integers and $G \in R^{N \times N}$ is a non-singular matrix referred to as the lattice generator matrix.

A lattice code $C(\Lambda, u_0, R)$ is the finite subset of the translated lattice $\Lambda+u_0$ lying inside the shaping region R and is given by $C=(\Lambda+u_0) \cap R$. The shaping region of a spherical lattice code is a sphere centered at the origin. For a specified data rate R, a lattice code spanning T symbol intervals has $M=2^{RT}$ codewords $\{c_i\}$, $i=1, \ldots M$. The generator matrix, shaping region and the translate are constrained so that the resulting codewords satisfy the energy constraint $$\frac{1}{M}\sum_{i=1}^{M}|c_i|^2 = Tn_T$$

Furthermore, if $|\{\Lambda+u_0\} \cap R|>M$, we discard the excess translated lattice points of maximum energy and still refer to the code as a spherical lattice code.

Next, the complex base-band received signal model of a MIMO system employing lattice codes may be written as:

$$y^c = \sqrt{\frac{\rho}{n_T}} H^c c^c + v^c \quad (16)$$

where $H^c \in C^{n_R \times n_T}$ is the complex fading channel matrix assumed to be known at the receiver, $v^c \sim N_c(0, I_{n_R})$ is the spatially and temporally white Gaussian noise. We can also write the system in Equation (16) as an equivalent real model given by:

$$y = \sqrt{\frac{\rho}{n_T}} HGx + v \quad (17)$$

where $$y = [\text{Re}\{y^c\}^T, \text{Im}\{y^c\}]^T, \quad (18)$$
$$v = [\text{Re}\{y^c\}^T, \text{Im}\{y^c\}]^T,$$

and $$H = I \otimes \begin{bmatrix} \text{Re}\{H^c\} & -\text{Im}\{H^c\} \\ \text{Im}\{H^c\} & \text{Re}\{H^c\} \end{bmatrix}$$

where I is T-dimensional identity matrix and $\otimes$ represents the Kronecker product.

Those skilled in the art will appreciate that decoding general lattice codes is not a trivial exercise because unlike uncoded QAM transmission, the boundary control can become very difficult—requiring exhaustive search through all codewords. Advantageously—and according to an aspect of the present invention—two additional methods may now be shown for lattice decoding.

As shall be shown, the first decoder follows the "naïve" decoder approach and completely ignores the boundary of the lattice code while generating the list of Monte Carlo candidates with their associated weights. It is therefore applicable to any lattice code.

The second decoder imposes the spherical boundary constraint while generating the Monte Carlo samples, therefore all the candidates lie inside or on the lattice boundary and the one with the highest weight is selected as the decoder output. For our purposes herein, by lattice boundary we mean the spherical shell centered on the origin containing the codewords of maximum (norm) energy. All translated lattice points strictly within the shell are codewords whereas some points on the shell need not be.

In both decoders, if the receiver has enough memory to store all codewords of maximum energy, then the decoders can perform an additional check whether the decoder output is a valid codeword. If not, the Monte Carlo sample containing a valid codeword with next highest weight is chosen as the decoder output. If, during a certain interval all the candidates are found to be invalid, an error is declared.

Naïve SMC Decoder

According to an aspect of the present invention, this decoder method follows the strategy outlined earlier for the reduced complexity decoder but with following differences. The MMSE filter F is derived using only the matrix $$\sqrt{\frac{\rho}{n_T}} H$$

in (17) without the ordering step. Using this filter we obtain the model $\bar{z}=Fy=\bar{R}Gq+w$, where q is a vector with integer valued elements such that $x=Gq+u_0$. The ordering step is applied on the matrix $\bar{R}G$ and finally QR decomposition is applied on the resulting ordered matrix and a model with a sequential structure as in equation (3) is obtained.

Then at each antenna and for each stream, a fixed number of possible candidates (no more than m) closest to the quantized received signal are listed, their weights calculated and m best candidates are selected. Weight computation and selection of the m best candidates can be done in an efficient manner as described in the case of QAM transmission. In the listing step, no consideration is given to the boundary of the lattice code. At the end of the procedure, from among all of the candidates, a valid codeword with highest weight is chosen as the decoder output. Advantageously, since this detector completely disregards the boundary constraint of the underlying lattice code, it is a very good general decoder and is not limited to spherical LAST codes.

Decoder 2

This second decoder of the present invention differs from the naïve implementation above, in that while generating the list of possible candidates for each stream, it finds the set of integers which satisfy the energy constraint—based on the already listed integers corresponding to the previous antennas.

More particularly, we let the Cholesky decomposition of the generator matrix be U, such that $U^T U=G^T G$. Additionally, we let x be any integer vector and for simplicity let the translate u be 0. Finally, we let the radius of the outermost shell of the code be denoted by r. The energy constraint can then be written as:

$$x^T U^T U x = \sum_{i=1}^{N} u_{ii}^2 \left[ x_i + \sum_{j=i+1}^{N} \frac{u_{ij}}{u_{ii}} x_i \right]^2 \leq r^2 \qquad (19)$$

The decoder then imposes the boundary constraints to find bounds on the admissible values $x_i$, i=1, ..., N can take. Beginning with i=N, from Equation (19) we obtain $u_{NN}^2 x_N^2 \leq r^2$ which gives the bounds on the values $x_N$ can take as $\lceil -r/u_{NN} \rceil \leq x_N \leq \lfloor -r/u_{NN} \rfloor$. Proceeding in a similar fashion, for the j-th stream, the bounds for $x_k$ are given by:

$$\left\lceil \frac{\sqrt{r^2 - \sum_{i=k+1}^{N} \left( \sum_{q=i}^{N} u_{iq} x_q^{(j)} \right)^2 }}{u_{kk}} - \sum_{i=k+1}^{N} u_{ki} x_i^{(j)} \right\rceil \leq \qquad (20)$$

$$x_k^{(j)} \leq \left\lfloor \frac{\sqrt{r^2 - \sum_{i=k+1}^{N} \left( \sum_{q=i}^{N} u_{iq} x_q^{(j)} \right)^2 }}{u_{kk}} + \sum_{i=k+1}^{N} u_{ki} x_i^{(j)} \right\rfloor$$

Therefore, and as can be appreciated by those skilled in the art, the search for points on or within the boundary defined by the lattice code constraint is limited. Simulation results show that similarly to the case of uncoded QAM transmission described previously, the MMSE preprocessing and ordering yields significant improvement in decoder performance. Moreover, LLL reduction can also be applied which helps to achieve roughly the same level of performance with fewer Monte Carlo streams. Further, the LLL reduction can be easily accommodated in the spherical boundary constraint described above Simulation Results To demonstrate the superior performance of the deterministic SMC methods according to the present invention—we first consider uncoded MIMO systems wherein $n_T = n_R = 4$ and $n_T = n_R = 8$ antennas, respectively. The communication channel is a frequency-flat Rayleigh fading channel with the fading coefficient generated according to $$[H]_{i,j} \overset{i.i.d.}{\sim} N_c(0,1).$$

We consider 16, 256 and 1024 QAM modulations, and Gray mapping is used for bit-to-symbol mapping. The channel is assumed to be fully known at the receiver.

Figure 5:
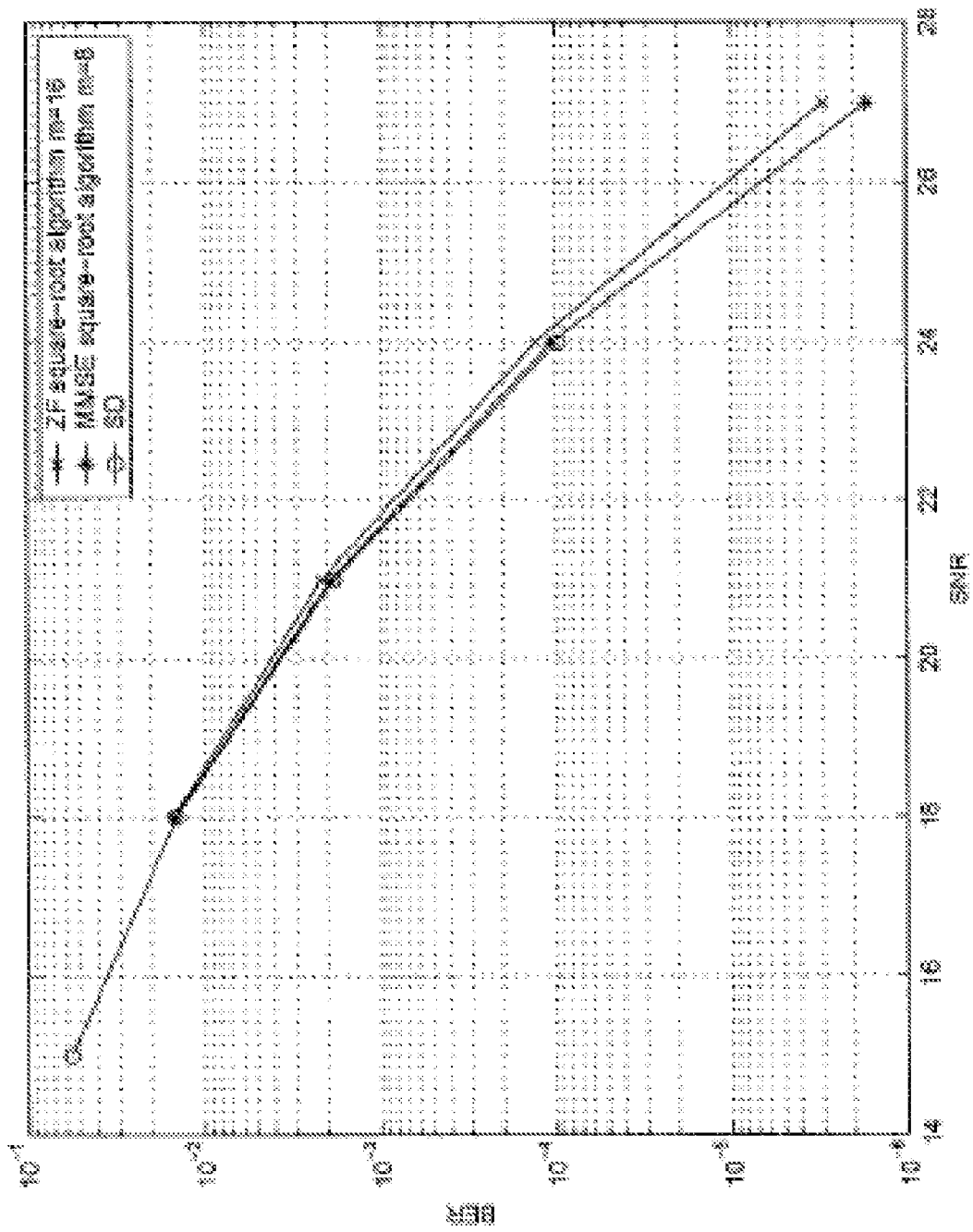
FIG. 5 is a graph showing the simulated BER performance of the square-root D-SMC MIMO demodulation methods with sphere decoder in an uncoded MIMO system wherein $n_T=n_R=4$, 16 QAM modulation.

FIG. 5 is a graph showing the BER performance of the square-root D-SMC MIMO demodulation methods with sphere decoder in an uncoded MIMO system wherein $n_T = n_R = 4$, 16 QAM modulation. As can be observed from that FIG. 2, the MMSE based square root method achieves ML performance with just 8 streams whereas the ZF based method requires 16 streams. Therefore, the MMSE based preprocessing offers substantial reduction in complexity.

Figure 6:
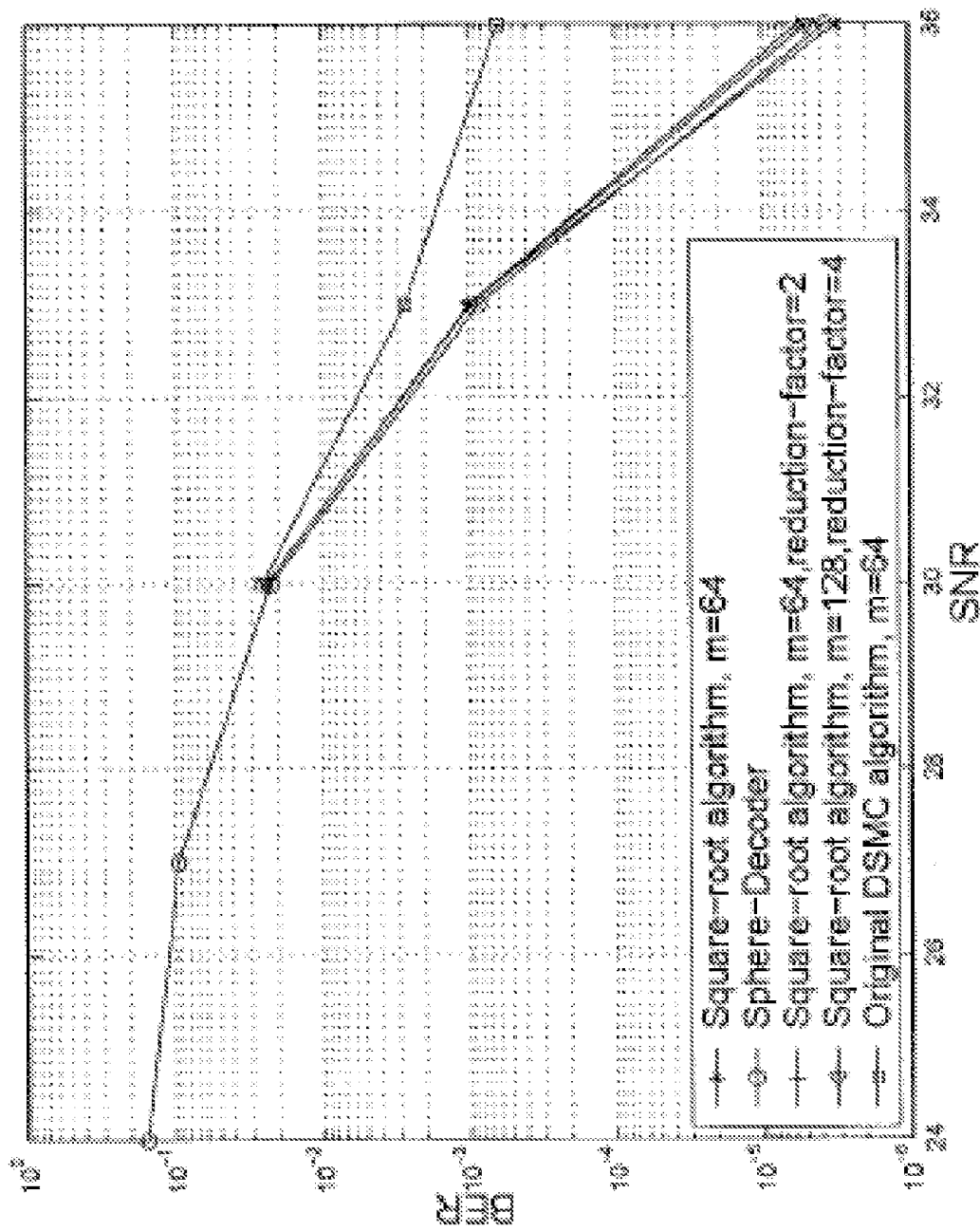
FIG. 6 is a graph illustrating the performance of the MMSE based square root method for an 8×8 system having 256-QAM modulation.
Figure 7:
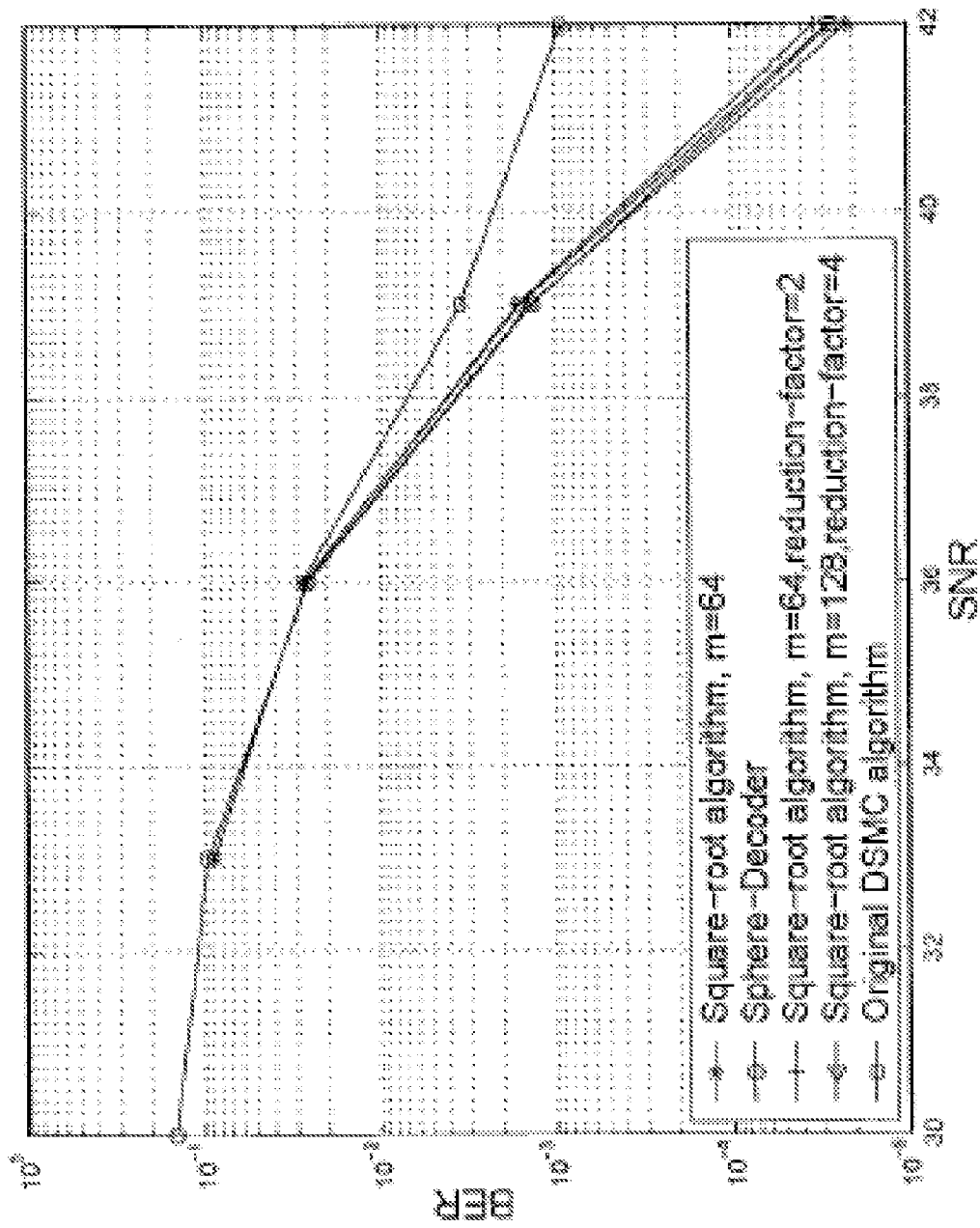
FIG. 7 is a graph illustrating the performance of the MMSE based square root method for an 8×8 system having 1024-QAM modulation.

FIG. 6 and FIG. 7 illustrate graphically the performance of the MMSE based square root method of the instant invention for an 8×8 system having 256-QAM and 1024-QAM modulation respectively. From these FIGs, we can readily observe that the deterministic SMC in conjunction with MMSE processing achieves the sphere decoder performance with as few as 64 streams. Moreover, even with a reduction factor of 4, it is able to achieve sphere decoder performance with 128 streams. One can also observe that the present method comprehensively outperforms the prior art deterministic SMC method for the same number of Monte Carlo streams. This superior performance of the SMC method may be attributed—in part—to the fact that it approximates the MAP detector whereas sphere decoder approximates the ML detector. Those skilled in the art will of course recognize that—in terms of BER performance—the MAP detector can outperform the ML detector.

Figure 8:
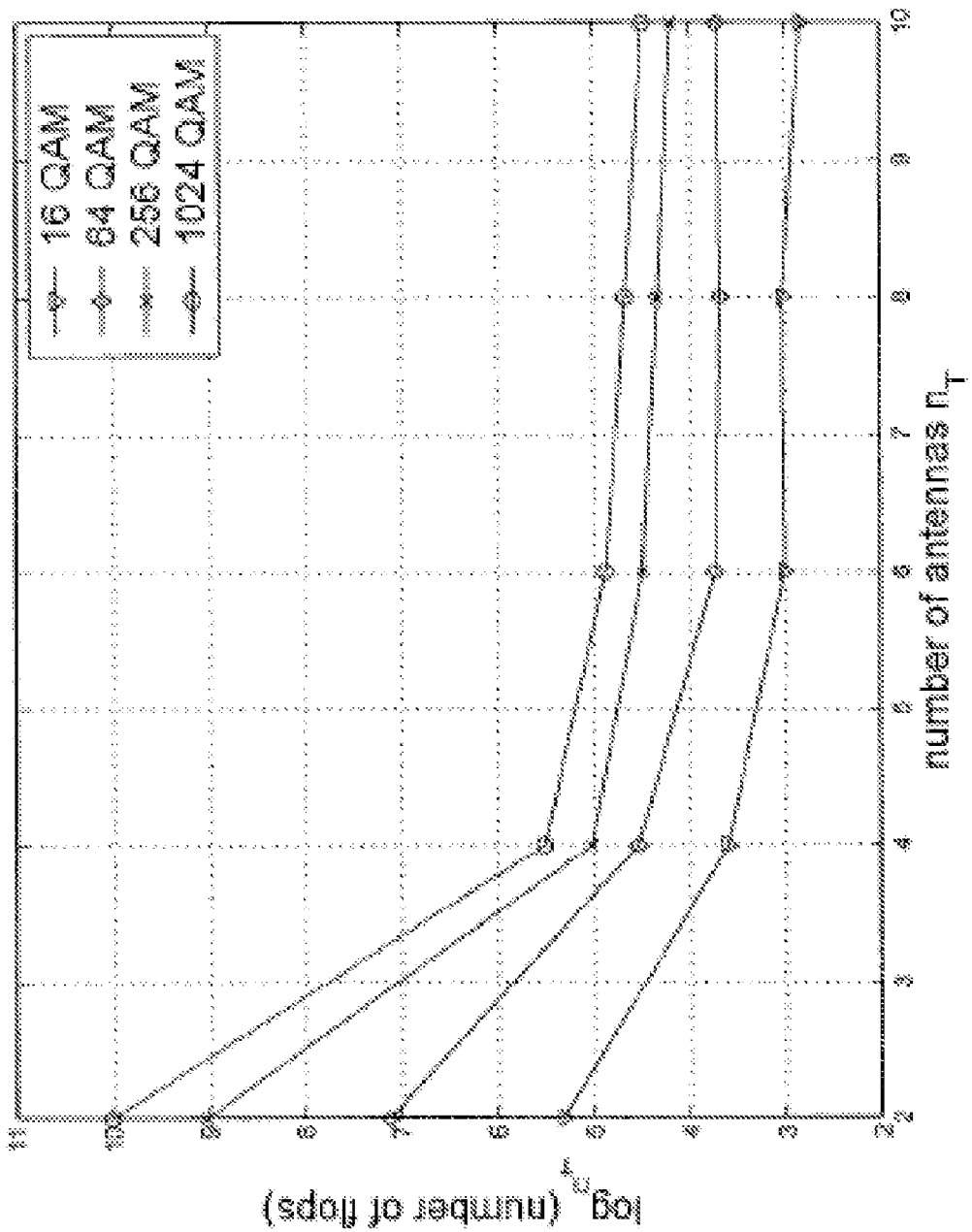
FIG. 8 is a graph which shows the complexity scaling with the number of transmit antennas for different constellation sizes.

Turning now to FIG. 8, there is shown a graph which shows the complexity scaling with the number of transmit antennas for different constellation sizes. As can be observed, the decoder according to the present invention achieves ML performance with a fixed polynomial complexity in the number of transmit antennas, varying as $O(n_T^n)$ where $n \in (3,4,5)$ for large systems, depending upon the constellation size. Moreover, for a fixed number of Monte Carlo streams, the complexity is only linear in $n_T$. Once again, and as can be readily appreciated, this results in significant savings since only small to moderate number of Monte Carlo samples are required to approach the ML performance.

Figure 9:
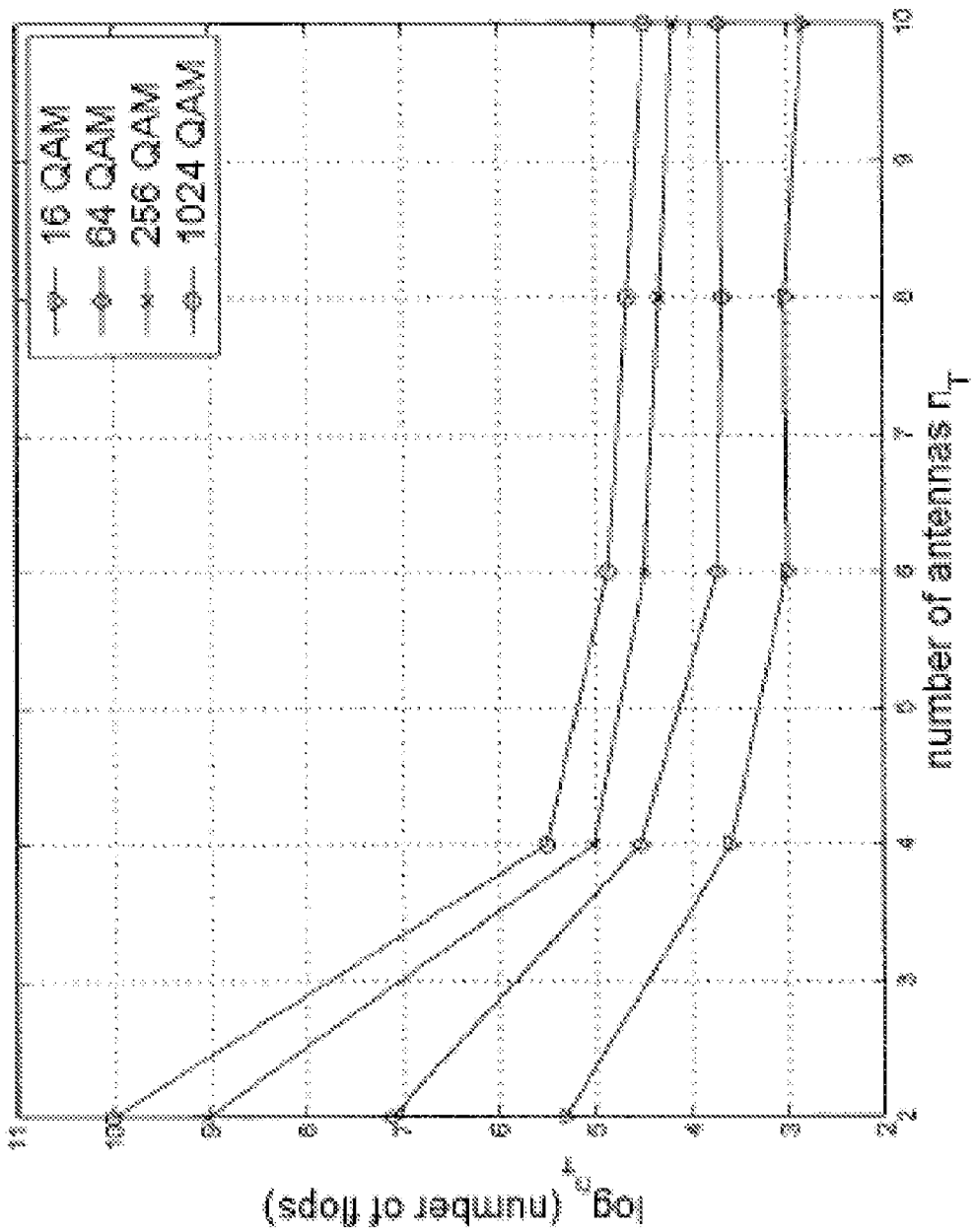
FIG. 9 is a graph showing BER performance comparison of MMSE and ZF based square-root D-SMC detectors in a coded MIMO system wherein $n_T=n_R=4$ and 16-QAM Modulation.

Lastly, turning now to FIG. 9, there is a graph of a 4×4 coded system using 16-QAM modulation and compare the performance of MMSE and ZF-based D-SMC method with no ordering, with column-norm based ordering and with optimal ordering, respectively. The system employs a standard rate ½ turbo code with 768 information bits being transmitted over each fading block. The D-SMC detector provides soft information (once for each channel use) to the turbo decoder but no exchange of soft information from the decoder to the D-SMC detector was allowed in order to capture a practical delay-constrained system. During the simulation, four (4) turbo decoder iterations were permitted. In the FIG, the block error rates (BLERs) achieved by various detector and decoder combinations are plotted. It can be seen that with 8 streams, MMSE with a fixed detection order provides a huge gain over its ZF counterpart.

Also, the performance of MMSE with column norm and optimal ordering is practically indistinguishable, which makes the lower-complexity column-norm based ordering more appealing. Remarkably, MMSE with either of these orderings improves by about 3 dB over its ZF counterparts.

Also note that for each channel realization column-norm based detection order is the same for ZF as well as MMSE front-ends. With column-norm based ordering, ZF with 16 streams results is nearly the same performance as MMSE with 8 streams. ZF with 16 streams and optimal ordering provides no further improvements and hence its plot is omitted. Further, in each detector-decoder combination considered here, almost no performance improvements were seen when the LLR computations were done based on a larger set obtained by avoiding the square-root (i.e., real-imaginary separation) step. For example, with 16 streams avoiding the square-root step results in 256 survivors (at the last antenna detected) as opposed to the 64 survivors obtained with this step. The lack of improvements indicates that expanding the set of survivors by avoiding the square-root step does not add "good" survivors even at the cost of increased complexity and hence is not recommended.

At this point we have described the invention using specific examples and embodiments. Those skilled in the art will recognize that the invention is not so limited, rather it should be limited only by the scope of the claims attached hereto.

What is claimed is:

1. A low complexity Minimum Mean Square Error (MMSE) based sequential Monte Carlo method for Multiple-Input Multiple-Output (MIMO) demodulation, said method comprising the steps of:
   receiving a plurality of signals at an array of receive antennas;
   estimating a channel matrix;
   determining a channel dependent order of demodulation that is responsive to the estimated channel matrix;
   processing the received signal vector through the use of MMSE techniques;
   modeling the processed received signal vector as being equal to the sum of a linear transformation of the transmitted symbols by a triangular matrix having positive diagonal elements and a vector representing a realization of a plurality of un-correlated Gaussian random variables; and
   demodulating the said transmitted symbols using deterministic sequential Monte Carlo techniques on the processed received signal and the said model.

2. The method of claim 1 in which the said positive diagonal elements of said triangular matrix is upper triangular and the deterministic sequential Monte Carlo technique comprises the steps of:
   listing the symbols for each antenna from a constellation, starting from antenna indexed as $n_T$, where $n_T$ denotes the number of transmit antennas, down to antenna indexed as 1;
   at each transmit antenna indexed by k, where k iterates from $n_T$ down to 1, selecting m survivor streams of greatest weights, where m is a pre-specified number of survivors, with the said weight of a stream being responsive to the last $n_T-k+1$ components of the processed received vector, the symbol values listed for antennas $n_T$ through k along that stream and the a-priori probabilities assigned to the said symbol values.

3. The method of claim 1 wherein the transmitted symbols are drawn from a rectangular quadrature amplitude (QAM) constellation.

4. The method of claim 3 in which the said positive diagonal elements of said triangular matrix is upper triangular and the deterministic sequential Monte Carlo technique comprises the steps of:
   listing the symbols for each antenna from a constellation, starting from antenna indexed as $n_T$, where $n_T$ denotes the number of transmit antennas, down to antenna indexed as 1; and
   at each transmit antenna indexed by k, where k iterates from $n_T$ down to 1;
   enumerating the real parts of all symbols from the rectangular QAM constellation employed by transmitter k;
   selecting m survivor streams of greatest weights, wherein said weight of a stream being responsive to the last $n_T-k+1$ components of the processed received vector, the symbol values listed for antennas $n_T$ through k−1 along that stream, the real part of that symbol value listed for antenna k and the a-priori probabilities assigned to said symbol values;
   enumerating the imaginary parts of all symbols from the rectangular QAM constellation employed by transmitter k;
   selecting m survivor streams of greatest weights, wherein said weight of a stream being responsive to the last $n_T-k+1$ components of the processed received vector, the symbol values listed for antennas $n_T$ through k−1 along that stream, the imaginary part of that symbol value listed for antenna k and the a-priori probabilities assigned to said symbol values.

5. The method of claim 4 wherein only a subset of real-parts of all symbol values and only a subset of imaginary-parts of all symbol values are enumerated.

6. A method for communicating data from a transmitter to a receiver in a Multiple-Input Multiple-Output (MIMO) wireless system, comprising:
   encoding a data stream to obtain spherical lattice codewords;
   transmitting the said codewords using a plurality of transmit antennas and time intervals;
   receiving a plurality of signals at an array of receive antennas and collecting the received signals over a plurality of time intervals;
   processing the collected received signals through the use of MMSE techniques;
   modeling the processed received signal vector as being equal to the sum of a linear transformation of the transmitted codeword and a vector representing a realization of a plurality of un-correlated Gaussian random variables; and
   decoding that said transmitted codeword using deterministic sequential Monte Carlo techniques on the processed received signal and the said model, said deterministic sequential Monte Carlo technique incorporating a spherical boundary constraint.

7. The method of claim 6 wherein a channel dependent order is determined and employed prior to using deterministic Monte Carlo techniques.

* * * * *